June 15, 1926.
F. E. BEST
1,588,569
COMPRESSION BRAKE
Filed June 10, 1924
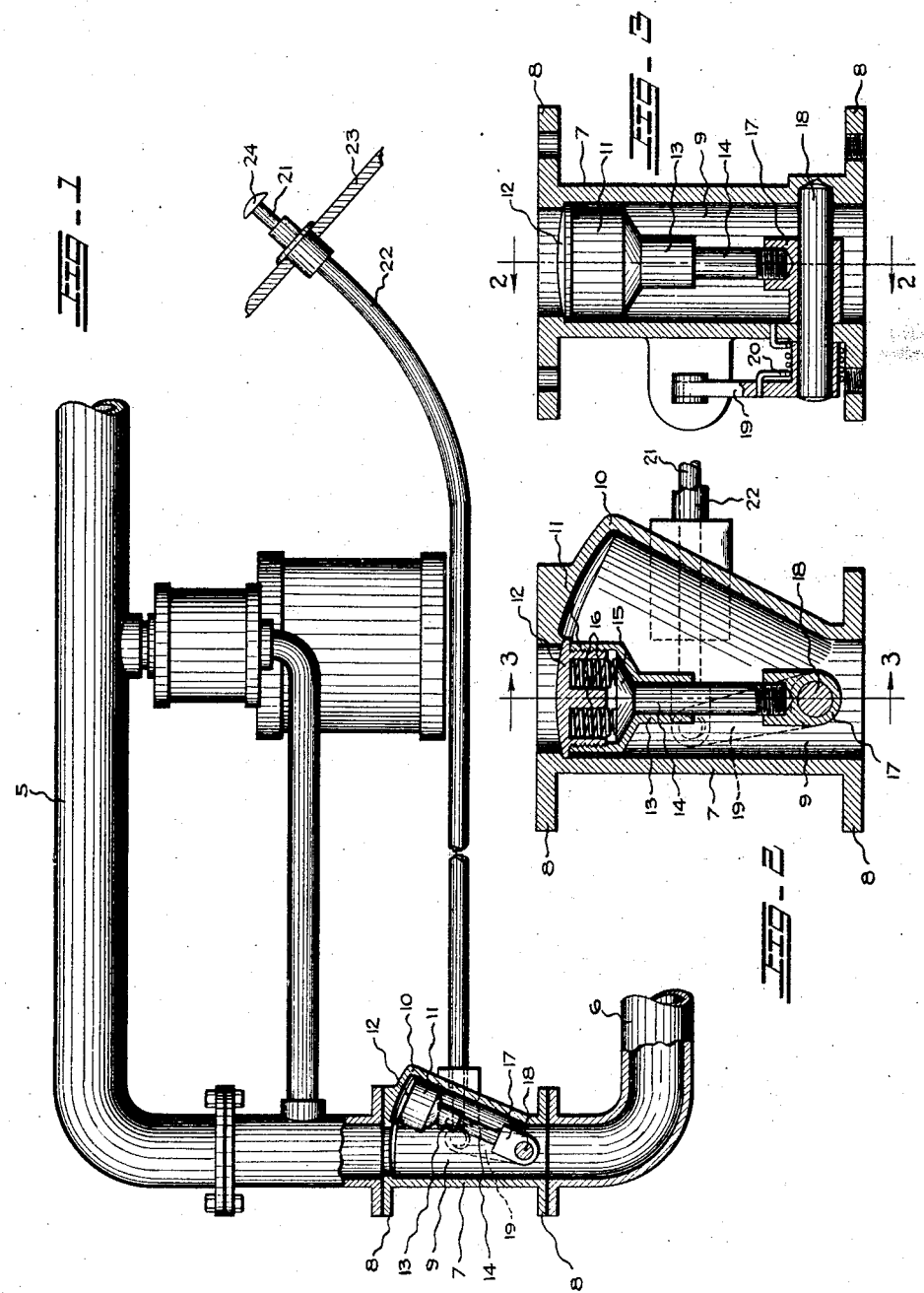
Frank Ellison Best
INVENTOR Patented June 15, 1926.

1,588,569

UNITED STATES PATENT OFFICE.

FRANK ELLISON BEST, OF SEATTLE, WASHINGTON.

COMPRESSION BRAKE.

Application filed June 10, 1924. Serial No. 719,192.

My invention relates to improvements in compression brakes for motor vehicles and the object of my improvement is to provide means for producing a back pressure or compression in the cylinders and exhaust passageways of an internal combustion engine to thereby exert a brake force on the engine, which brake force may be communicated through the usual power transmission to the rear wheels of a motor vehicle.

Another object is to provide a relief valve in connection with a device of this nature for eliminating all possibility of damage due to excess pressure in the exhaust passageways.

This invention makes it possible to obtain a maximum brake effect from a motor vehicle engine while the transmission is in the high gear driving relation, thus relieving the necessity for shifting into low or intermediate gear or for using the ordinary brakes in driving down hills. By operating in this manner this invention relieves the usual brakes of much wear and relieves the transmission of the wear strain and grinding occasioned by using the engine for a brake when the transmission is in low or intermediate gear. It also provides a brake that will operate quietly and without any grinding of gears.

With the above and other objects in view, the invention consists in the novel construction, adaptation and combination of parts as will be more clearly hereinafter described and claimed.

In the drawing Figure 1 is a somewhat diagrammatic view partly in elevation and partly in section showing my invention applied to the exhaust manifold of the internal combustion engine of a motor vehicle, a fragment only of the exhaust manifold being shown.

Figure 2 is a sectional view on broken line 2—2 of Fig. 3 of a valve unit embodied in the invention.

Figure 3 is a sectional view of the valve unit substantially on broken line 3—3 of Fig. 2.

Like reference numerals designate like parts throughout the several views.

Referring to the drawings 5 designates an exhaust manifold or conduit of an engine, usually of the internal combustion type used on motor vehicles, but which may be a steam engine, and 6 is another conduit that may lead to a muffler or point of discharge of exhaust products.

In accordance with my invention I provide a valve adapted to be interposed in the exhaust discharge conduit formed by pipes 5 and 6, said valve embodying a housing 7 flanged at both ends as at 8, for engagement with corresponding flanges on pipes 5 and 6, and having a tubular passageway 9 of substantially the same cross sectional area as the pipes 5 and 6.

The housing 7 has a valve receptacle 10 at one side of the passageway 9, wherein a valve hereinafter described, may remain when it is inoperative. The valve embodies a cylindrical valve head 11 having a cap 12 threaded thereinto. Valve head 11 is provided on the bottom end with a tubular shank 13 that is slidably disposed on a stem 14. The upper end of stem 14 has a conical head 15 disposed within the valve head 11. Compression springs 16 interposed between cap 12 and head 15 resiliently support cap 12 in raised position and are sufficiently strong to withstand the usual pressure to which they are subjected without yielding. If, however, the cap 12 is subjected to an excess pressure then the springs 16 will be compressed and the entire valve head will slide downwardly on stem 14 forming an opening around the periphery of cap 12 through which the excess pressure may escape. The amount that the valve head may move downwardly on stem 14 is limited by engagement of the bottom end of cap 12 with the top of conical head 15 of stem 14. By operating in the manner above described the resiliently supported valve head functions as a safety valve to relieve excess pressure in the exhaust passageways and prevent any damage being done when the valve is in the closed position shown in Fig. 2.

The bottom end of valve stem 14 is secured to a hub 17 that is rigid with a rotatably mounted transverse shaft 18, one end of which extends outwardly through the side of valve housing 7 and has a lever arm 19 provided thereon. A torsion spring 20 on the hub of lever arm 19 resiliently urges the valve into the fully open position shown in Fig. 1.

The lever arm 19 is arranged to be oscillated by a flexible push member 21 that is connected with its upper end and extends through a tube 22 to the footboard 23 of the motor vehicle on which the device is installed and terminates in a head 24 on which the foot may be placed for operating the valve in substantially the same way that the usual foot throttle is operated.

The pivot shaft 18 extends substantially diametrically across the passageway 9 and the valve member, being mounted to oscillate on said pivot shaft, is very easily moved either toward the open or closed position irrespective of the pressure of the exhaust gases.

In operation pressure on the flexible push member 21 will move the valve from the fully open position shown in Fig. 1 where it is normally held by spring 20 toward the fully closed position shown in Fig. 2, giving any area of opening that is desired between the fully open and fully closed positions thus producing any desired back pressure in the exhaust conduits and increasing to any desired extent the compression brake force of an engine.

In connection with most of the engines on which this device is installed, I provide check valves in the full inlet passageways leading to the engine cylinders which permit the usual fuel charges to enter freely but prevent compressed exhaust gas from surging back through the full inlet passageways when the fuel inlet valves open.

This device is absolutely quiet in operation, prevents the usual noise and wear of transmission gears due to shifting into low or intermediate when using the engine as a brake on a motor vehicle and greatly reduces the wear on the usual vehicle brakes.

The foregoing description and accompanying drawings are illustrative of one preferred embodiment of my invention only, it being understood that numerous changes may be resorted to within the scope and spirit of the following claims.

I claim:

1. The combination with a motor vehicle having an engine provided with exhaust means, of compression brake devices embodying a valve controlling the opening and closing of said exhaust means, and means including a foot pedal operable from the drivers seat for actuating said valve.

2. In a compression brake for internal combustion engines the combination with an exhaust pipe, of a valve housing interposed in said exhaust pipe, said valve housing having a straight passageway arranged to register with said exhaust pipe and having a valve receptacle at the side of said straight passageway, a pivot extending crosswise of said straight passageway through the axis of the same, a valve mounted on said pivot and arranged to swing into and out of said valve receptacle and means for moving said valve.

3. In a compression brake for internal combustion engines, the combination with an exhaust pipe affording a straight passageway and having a valve receptacle at one side of said passageway, of a valve stem pivoted for swinging movement on an axis that is perpendicular to and intersects the axis of said passageway, means for moving said valve stem and a valve head mounted on said valve stem and arranged to be moved from a position entirely within said valve receptacle to a position in which it will entirely close said passageway.

FRANK ELLISON BEST.